Wakeman & Ballance,
Hay Press.
N° 47,883.   Patented May 23, 1865.
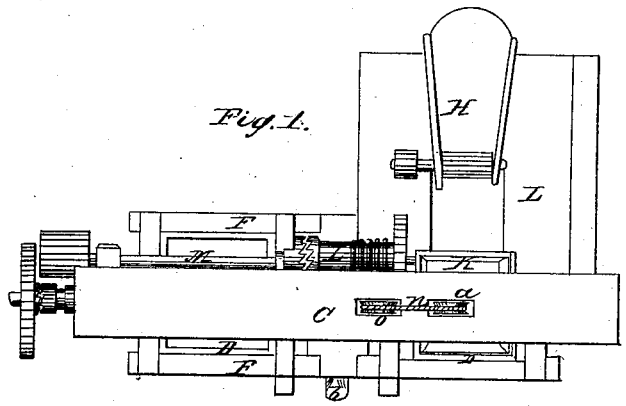
Fig. 1.
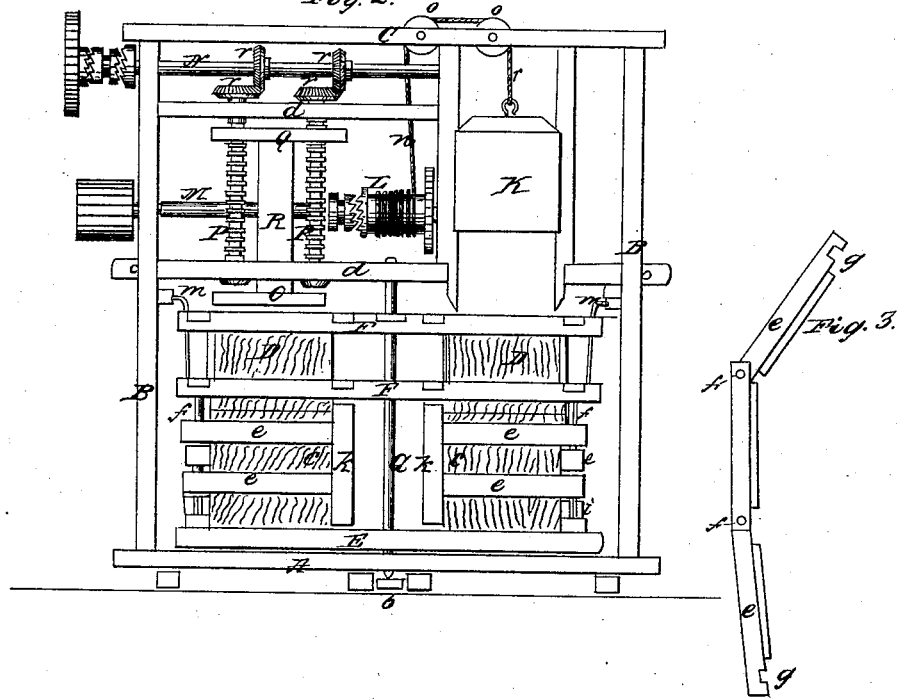
Fig. 2.
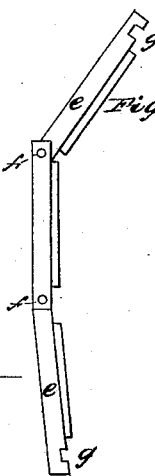
Fig. 3.
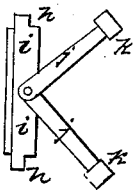
Witnesses.
J. B. Woodruff
Jacob B. Hall
Inventors.
Roswell Wakeman
Jesph L. Ballance

UNITED STATES PATENT OFFICE.

ROSWELL WAKEMAN AND JOSEPH L. BALLANCE, OF PORT DEPOSIT, MD.

IMPROVEMENT IN CUTTING AND PRESSING HAY, &c.

Specification forming part of Letters Patent No. 47,883, dated May 23, 1865.

*To all whom it may concern:*

Be it known that we, ROSWELL WAKEMAN and JOSEPH L. BALLANCE, of Port Deposit, in the county of Cecil, State of Maryland, have invented a certain new and useful Combined Apparatus for Cutting, Packing, and Pressing into Bales Cut Hay; and the following is a full, clear, and exact description of the same, reference being had to the accompanying drawings, making a part of this specification, in which—

Figure 1 represents a plan or top view of the apparatus or machine. Fig. 2 shows a side elevation or front view. Fig. 3 shows a detached horizontal section through the box for pressing cut hay into bales, and the arrangement of opening to discharge the same.

The object of our invention is to supply the market and the consumer with cut hay or chop-feed in nicely-compacted bales of such weight and dimensions that they can be easily handled without waste and occupy small space—a great desideratum in cities with those who keep one or two horses or cows, &c.

Our invention consists in the combination and arrangement of a feed-cutter, a stamping apparatus, a screw-press and follower, a vertical double-rotating adjustable platform containing two pressing-boxes, so that while the one is being filled with the cut hay the other can be pressed into a solid and compact bale and discharged from the press, it being liberated by opening both sides of the box, as seen in Fig. 3.

To enable others skilled in the art to make and use our invention, we will describe its construction and its operation more fully, referring to the drawings and to the letters of reference marked thereon.

We make a substantial frame of timber, it being supported on a base or sill, A, with upright posts B B, and a plate, C, the width of the frame being sufficient to allow two suitable-size receivers or packing-boxes, D D, to be placed on a solid platform, E, the boxes being secured together by frames F F at the upper portion, above where the boxes are made to be opened, to fasten and discharge the bale after it is packed. The lower portion of the boxes D D are clamped together with strong timbers $e\ e\ e$, which are hinged together at the corner by putting an iron rod or bolt, $f f$, down through the series of the timbers, so that the two opposite sides will open outward. The ends of the timbers which are not held by the rods $f f$ have notches $g\ g$, to fit the tenons $h\ h$ on the timbers $i\ i$, which form the fourth side to complete the box D, and when the box is closed to receive the cut hay the doors $c\ c$ are firmly held in their places by the vertical timbers $k\ k$, which are hinged to the side of the box by arms $j\ j$. The platform E and frames F F are secured to a vertical shaft, G, placed in the center of the frame, so that the packing-boxes D D will, by the action of a pedal, $b$, under the shaft G, raise the platform E off the base A and allow the boxes D D to swing round and be placed alternately under the receiving and packing apparatus and the press, where they are held by the catches $m\ m$. The hay-cutter H is mounted upon a platform, I, placed on one side of the frame in such a position that the cut hay will readily slide into the top of one of the boxes, where it is stamped or packed in by the drop K, made to operate automatically by the cord $n$ and pulleys $o\ o$, and clutch-windlass L on the main driving-shaft M. When the box D is packed full of the cut hay, it is swung round and placed under the press, leaving the other box in the proper position for being filled in the same manner, while the follower O is brought down by the screws P P, which have their bearings in boxes fitted into the timbers $d\ d$, placed horizontally in the frame to support the pressing mechanism. The two screws P P, being secured top and bottom, are made to operate on the follower O by a yoke, Q, in which the beam R of the follower is fastened in the center, the yoke having the boxes or nuts for the screw-threads on each side of the follower near the ends, so that no guides other than the screws P P are necessary, the screws being operated both ways—down and up—by bevel-gear wheels $a\ a$, driven by corresponding gear-wheels, $r\ r$, on the horizontal shaft N, near the top of the machine.

It is a well-established fact that there is great economy in using cut hay in feeding cattle, even when a large stock is kept on the farm where the grass is grown; but in cities and villages, where a person keeps only one or a pair of horses, or a cow or two, and purchases his feed at the market prices, the economy of using cut hay is still more apparent; and the expense of a good hay or straw cutter is considerable, and the labor of cutting by hand-power is so great that but few, comparatively, use them, and hay cut and sold by feed-dealers, generally by the bushel, is at an advance of from thirty to fifty per cent. But few persons in cities who keep but two or three horses or cows are provided with stable room or lofts in which to store away a load of hay, and consequently they buy their hay put up into bales. It is therefore to supply small consumers of feed with chopped hay put up in convenient-sized bales that we have constructed, arranged, and combined the hay cutting, packing, and pressing apparatus herein described.

It will readily be seen that by the above arrangement there will be a great saving of time and labor, and that consumers can be supplied with cut hay or straw in a condition ready for use at a small advance in the price over ordinary bales of hay.

Having thus described our invention, its operation and use, what we claim as new, and desire to secure by Letters Patent, is—

1. The hay-cutter so combined with a hay-press and so arranged and operated as to discharge the cut hay into the pressing-box, in combination with an automatic stamping or packing apparatus, substantially as and for the purposes herein set forth.

2. The manner of fastening the doors of the packing or pressing boxes, as herein described.

3. The combination of machinery, as herein described, for pressing cut hay into bales.

In testimony whereof we hereunto set our hands and affix our seals.

ROSWELL WAKEMAN. [L. S.]
JOSEPH L. BALLANCE. [L. S.]

Witnesses:
J. B. WOODRUFF,
JACOB B. HALL.